(12) United States Patent
Stein

(10) Patent No.: US 6,370,250 B1
(45) Date of Patent: Apr. 9, 2002

(54) METHOD OF AUTHENTICATION AND STORAGE OF PRIVATE KEYS IN A PUBLIC KEY CRYPTOGRAPHY SYSTEM (PKCS)

(75) Inventor: Kyle P. Stein, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/182,302

(22) Filed: Oct. 29, 1998

(51) Int. Cl.$^7$ .................................................. H04L 9/00
(52) U.S. Cl. ........................ 380/281; 380/284; 380/277
(58) Field of Search ................................. 380/281, 282, 380/284, 286, 277; 713/165, 194, 171

(56) References Cited

U.S. PATENT DOCUMENTS

| | | | |
|---|---|---|---|
| 4,633,036 A | 12/1986 | Hellman et al. | 178/22.11 |
| 5,005,200 A | 4/1991 | Fischer | 380/30 |
| 5,210,795 A * | 5/1993 | Lipner et al. | 713/187 |
| RE34,954 E | 5/1995 | Haber et al. | 380/49 |
| 5,659,616 A | 8/1997 | Sudia | 380/23 |
| 5,706,512 A | 1/1998 | Bahls et al. | 395/621 |
| 5,706,513 A | 1/1998 | Bahls et al. | 395/621 |
| 5,719,938 A * | 2/1998 | Haas et al. | 705/52 |
| 5,818,936 A * | 10/1998 | Mashayekhi | 713/167 |
| 5,870,475 A * | 2/1999 | Allan et al. | 380/282 |
| 6,009,174 A * | 12/1999 | Tatebayashi et al. | 380/277 |
| 6,154,543 A * | 11/2000 | Baltzley | 380/255 |

OTHER PUBLICATIONS

Schneier, "Applied Cryptography, $2^{nd}$ Ed.," Section 24.5, pp. 566–571, 1996.*

Schneier, "Applied Cryptography, $2^{nd}$ Ed.," Section 8.4, pp. 178–179, 1996.*

* cited by examiner

*Primary Examiner*—Phung M. Chung
*Assistant Examiner*—Steve Kabakoff
(74) *Attorney, Agent, or Firm*—David A. Mims, Jr.; Bracewell & Patterson, L.L.P.

(57) ABSTRACT

Private keys for a public key cryptography system are protected within private key storage and communication by the requirement of a password to extract the private key based on a password during decryption. Upon receipt of a message encrypted with the public key, both the public key and the protected private key are retrieved from key storage. Interception of this transaction is useless since the protected private key alone cannot be utilized to decrypt the received message. A user is authenticated by extracting a potential private key from the protected private key utilizing a hashed password value, encrypting a well-known message with the public key, decrypting the encrypted well-known message utilizing the potential private key, and comparing the original and decrypted well-known messages. If they match, the extracted private key is employed to decrypt the received message. Signature values based on the password and/or private key may be employed to change the password or add new public key/private key pairs to the key storage.

23 Claims, 5 Drawing Sheets

METHOD OF AUTHENTICATION AND STORAGE OF PRIVATE KEYS IN A PUBLIC KEY CRYPTOGRAPHY SYSTEM (PKCS)

BACKGROUND OF THE INVENTION

1. Technical Field

The present invention relates in general to electronic data transfer security and in particular to defeating private key discovery attacks in a public key cryptography system. Still more particularly, the present invention relates to providing an authentication mechanism for accessing private keys utilizing in decoding an encrypted data transfer.

2. Description of the Related Art

Security for electronic communications—e-mail, HTTP transactions, telephone communications, etc.—is essential for a variety of enterprises employing publicly shared or otherwise insecure communications channels, including Internet storefront businesses which wish to conduct electronic commerce. One of the most common techniques for providing the requisite security is encryption of data transfers utilizing a public key cryptography system (PKCS).

Public key cryptography encryption actually relies on a pair of keys: a public key and a private key. Public-key algorithms are designed so that the key used for encryption is different from the key used for decryption (i.e.—the encryption algorithm is not symmetric) and so that the decryption key cannot be readily calculated from the encryption key. Thus, one key—typically, but not necessarily, the encryption key—may be published while the corresponding key is kept secret.

In PKCS systems, the public key is generally published to the party sending the message and utilized to encrypt the message by an one-way or irreversible encryption algorithm, resulting in an encrypted message which cannot be decrypted or deciphered utilizing the public key, but only by utilizing a corresponding private key known only to the intended recipient. The encrypted message is transmitted to the intended recipient, which utilizes the private key to decrypt the message.

A common implementation of PKCS, for example, employs Rivest-Shamir-Aldeman (RSA) and Data Encryption Standard (DES) encryption. A message to be transferred is first encrypted by a one-way encryption algorithm with a random (or, more commonly, pseudo-random) DES key. The DES key is also encrypted utilizing the public key of the intended recipient, and both the encrypted message and the encrypted DES key are transmitted to the intended recipient. When the message and DES key arrive, the recipient employs the private key to decrypt the DES key, then decrypts the message using the newly-acquired DES key.

Encryption keys employed for public key cryptography are preferably random, or at least pseudo-random. Furthermore, larger encryption keys (i.e. 128 bits as opposed to 40 bits) provide greater security. As a result, private keys are not easily committed to memory by a user and instead are most commonly stored in nonvolatile storage by or for the owner, such as within a database containing public key/private key pairs.

By their nature, private keys must be protected, which means that the security of any public key cryptography system is limited by the security of the database containing private keys and by the security of the communications channel employed to retrieve information from the database. For instance, in a network computer environment where a number of users share a common user unit or "roam" among user units connected to a network, the private key database of a particular user may be maintained on the network, with private keys retrieved over the network. PKCS becomes useless if the private keys are readily available or easily intercepted in that or similar situations.

It would be desirable, therefore, to provide a mechanism for securing private keys for a public key cryptography system.

SUMMARY OF THE INVENTION

It is therefore one object of the present invention to provide an improved method and apparatus for providing electronic data transfer security.

It is another object of the present invention to provide a method and apparatus for defeating private key discovery attacks in a public key cryptography system.

It is yet another object of the present invention to provide an authentication mechanism for accessing private keys utilizing in decoding an encrypted data transfer.

The foregoing objects are achieved as is now described. Private keys for a public key cryptography system (PKCS) are protected with the hashed value of a password known only to an authorized user. The overall security of the PKCS system is thus augmented beyond the security of private key storage and communication when decrypting a message by the requirement of a password to extract the private key based on a password. Strong one-way hash functions and password strength rules may additionally improve overall security. Upon receipt of a message encrypted with the public key, both the public key and the protected private key are retrieved from key storage. Interception of this transaction is useless since the protected private key alone cannot be utilized to decrypt the received message. The user is prompted for entry of a password, and the password is verified by extracted a potential private key from the protected private key utilizing the hashed password value, encrypting an well-known message with the public key, decrypting the encrypted well-known message utilizing the potential private key, and comparing the original and decrypted well-known messages. If they match, the password is verified, and the extracted private key is employed to decrypt the received message. Signature values based on the password and/or private key may be employed to change the password or add new public key/private key pairs to the key storage. Since the password and/or private key are included, the signature value changes each time, thus guarding against replay attacks.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
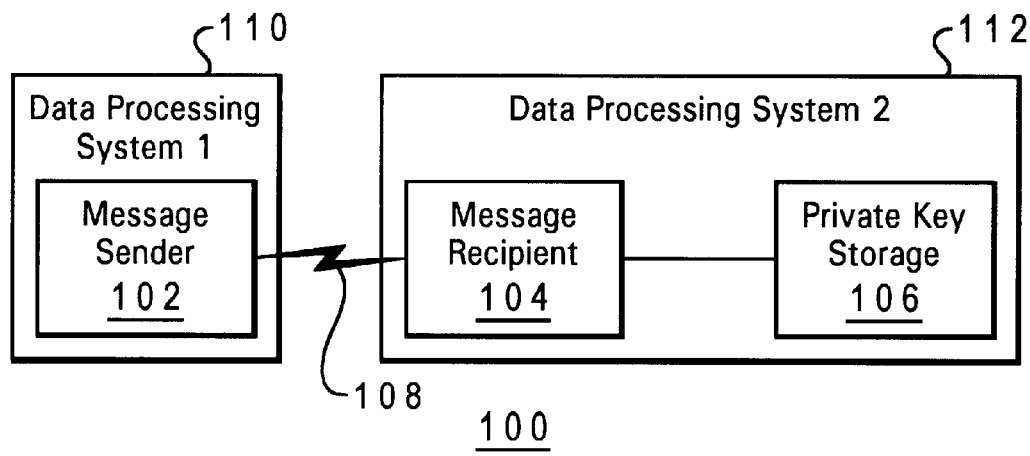
FIGS. 1A–1B depict block diagrams for alternative embodiments of a data processing system network in which a preferred embodiment of the present invention may be implemented.
Figure 1B:
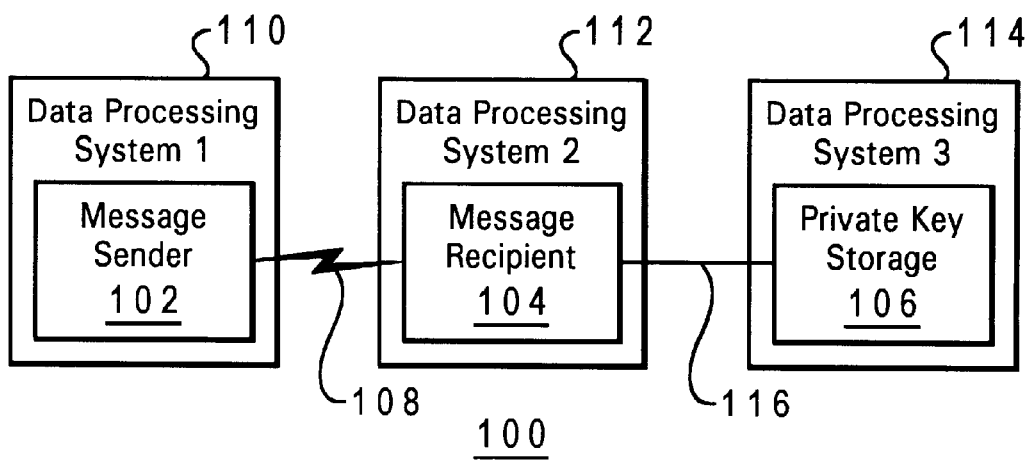

With reference now to the figures, and in particular with reference to FIGS. 1A–1B, block diagrams for alternative embodiments of a data processing system network in which a preferred embodiment of the present invention may be implemented are depicted. Data processing system network 100 includes a message sender 102, a message recipient 104, and private key storage 106. Message sender 102 and message recipient 104 are coupled by communications link 106. Message sender 102 may comprise, for example, a server application transmitting a secured form, where message recipient 104 is a client application receiving the secured form. Communications link 106 may conform to the TCP/IP and/or HTTP protocols.

In both alternative embodiments depicted, message sender 102 operates within a first data processing system 110. In the embodiment depicted in FIG. 1A, message recipient 104 and private key storage 106 are both contained within a second data processing system 112. Private key storage 106 may thus simply comprise a database application on nonvolatile storage, such as a hard disk drive, within data processing system 112. In the embodiment depicted in FIG. 1B, however, message recipient 104 and private key storage 106 are contained within separate data processing systems 112 and 114, respectively. Retrieval of information from private key storage 106 by message recipient 104 may thus entail data transfers over a communications link 116 coupling data processing system 112 to a network, such as a local area network, the Internet, or the like.

Those skilled in the art will recognize that many additional components for data processing system 100 which are not depicted may be employed, and that numerous variations of the configuration shown are possible. Such variations are believed to be within the spirit and scope of the present invention when implementing a private key storage and recovery authentication systems as described in further detail below. Moreover, while data processing systems are depicted in the exemplary embodiment, the present invention may also be implemented for other types of communications devices, such as analog or digital cellular or cordless telephones, automatic teller machines, and the like.

Figure 2:
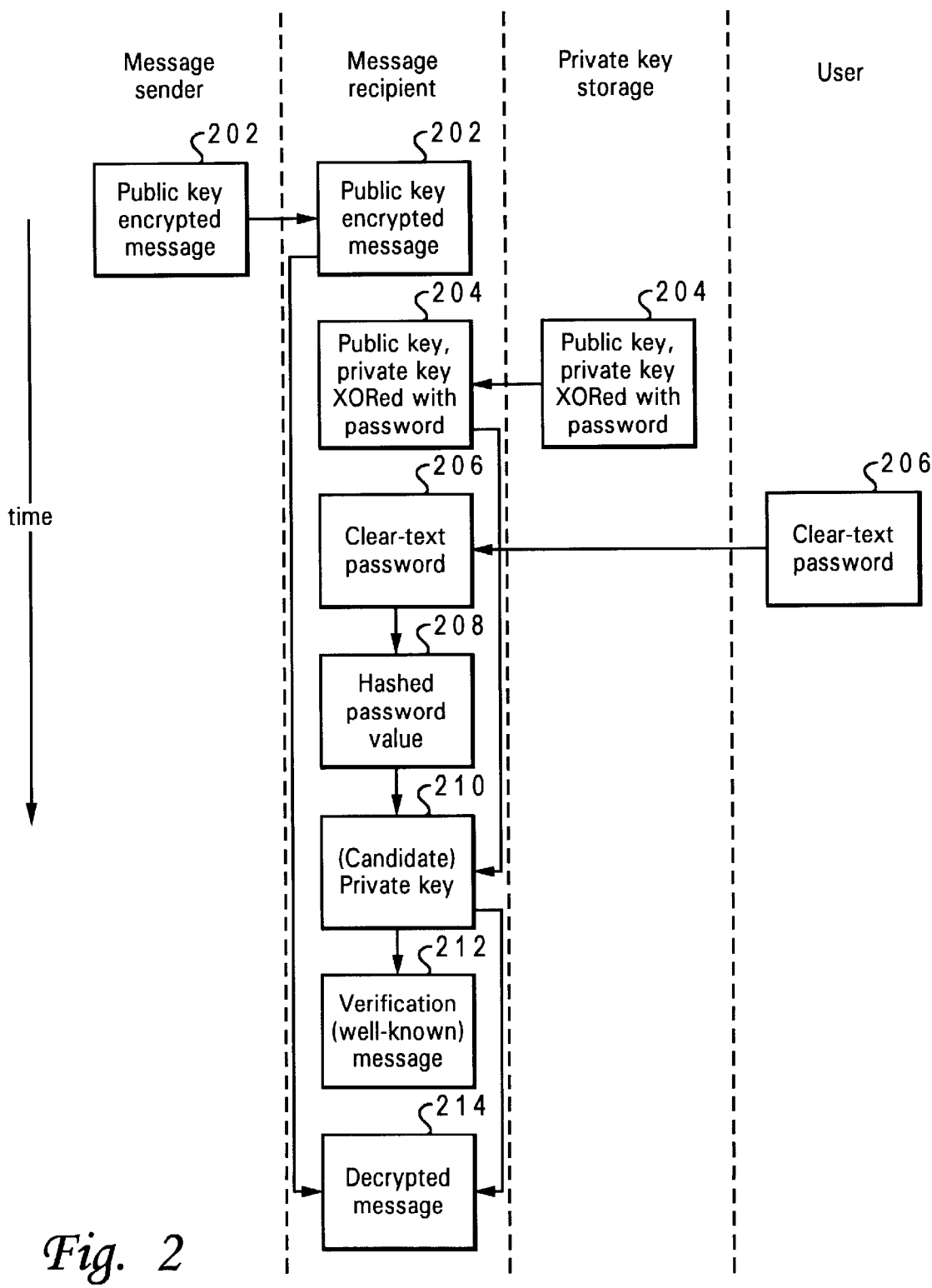
FIG. 2 is a data flow diagram for a private key storage and recovery authentication system in accordance with a preferred embodiment of the present invention.

Referring to FIG. 2, a data flow diagram for a private key storage and recovery authentication system in accordance with a preferred embodiment of the present invention is illustrated. The private key storage and recovery authentication system is implemented within a data processing system network of the type depicted in FIG. 1.

It is well-established that providing a password which hashes to the same value as a stored hash result is a valid means for authentication. Strong one-way hash functions such as SHA (Secure Hash Algorithm), MD2 or MD5 (Message Digest version 2 and 5, respectively) and password strength rules known in the art help strengthen this method of authentication against attacks. Such authentication is employed in the present invention to store and transmit private PKCS keys in a format providing protection and authentication. Only publicly available data is stored and transmitted, so no security requirements are placed on the database or communications to and from the database.

The following notation is observed in the below description of the authentication mechanism of the present invention: $K_{pub}$ is a user's public PKCS key for transactions with one or more entities; $K_{priv}$ is the user's corresponding private PKCS key; PW is the hashed value of a password known only to the user, and may be associated with more than corresponding public key/private key pairs; K(m) is the encryption result of encrypting or decrypting message m using PKCS key K (that is, $K_{pub}$ (m) is the result of encrypting message m with public key $K_{pub}$) and a⊙b is the exclusive-OR (XOR) of values a and b.

In the present invention, private key storage contains two items of information for each public key/private key pair of PKCS keys employed. These values, both of which are publicly readable, are the public key $K_{pub}$ and the value of the private key $K_{priv}$ XORed with the hashed password value PW, or $K_{priv}$⊙PW. The value $K_{priv}$⊙PW gives no indication of private key $K_{priv}$ without prior knowledge of password PW, since for any possible value of $K_{priv}$ there exists a corresponding PW which produces the stored value $K_{priv}$⊙PW. However, the hashed password value PW should not be a public value, as it is in some authentication protocols.

The data flow for authentication and key recovery in accordance with the present invention begins with receipt of a public key-encrypted message $K_{pub}$ (m) 202 by the message recipient, transmitted by the message sender. The message recipient then prompts the private key storage for a data packet 204 containing the public key $K_{pub}$ and the corresponding private key $K_{priv}$ exclusive-ORed with the hashed password value PW ($K_{priv}$⊙PW). The message recipient next prompts the user for the clear-text password 206 associated with the stored values 204 for that user.

At this point, all external data transfers are complete. With the exception of the clear-text password, only publicly available data is transferred in a manner which permits interception or eavesdropping. In accordance with known procedures for avoiding password discovery attacks, alphanumeric clear-text passwords should be remembered by the user (without being recorded anywhere), never disclosed to other parties, and changed periodically. In alternative embodiments, fingerprint or retinal scans may be employed as the clear-text password.

The message recipient then performs a strong, one-way hash on the clear-text password obtained from the user to derive the hashed password value PW 208. This hashed password value 208 is utilized in conjunction with the portion of stored values 204 containing the private key exclusive-ORed with the hashed password value 208 to recover a candidate private key 210 by computing:

$$K'_{priv} = (K_{priv} \odot PW) \odot PW.$$

Candidate private key $K'_{priv}$ 210 is then verified by encrypting a well-known message M using public key $K_{pub}$ and decrypting the result using candidate private key $K'_{priv}$ 210:

$$M' = K'_{priv}(K_{pub}(M)).$$

The decrypted verification message M' 212 is then compared to the original well-known message M, since:

$$M'=M \Leftrightarrow K'_{priv}=K_{priv}.$$

So, if and only if the computed verification message M' 212 is identical to the original well-known message M, the user in authenticated based on the hashed value PW of the clear-text password provided, and the correct private key $K_{priv}$ is recovered. It is noteworthy that the hashed password value PW and private key $K_{priv}$ are known only to the message recipient, and have not flowed across any communication lines. Upon notification that verification message M' 212 matches the original well-known message M, the message recipient decrypts encrypted message 202 with (verified) private key $K_{priv}$, and displays or otherwise appropriately processes decrypted message 214.

Figure 3:
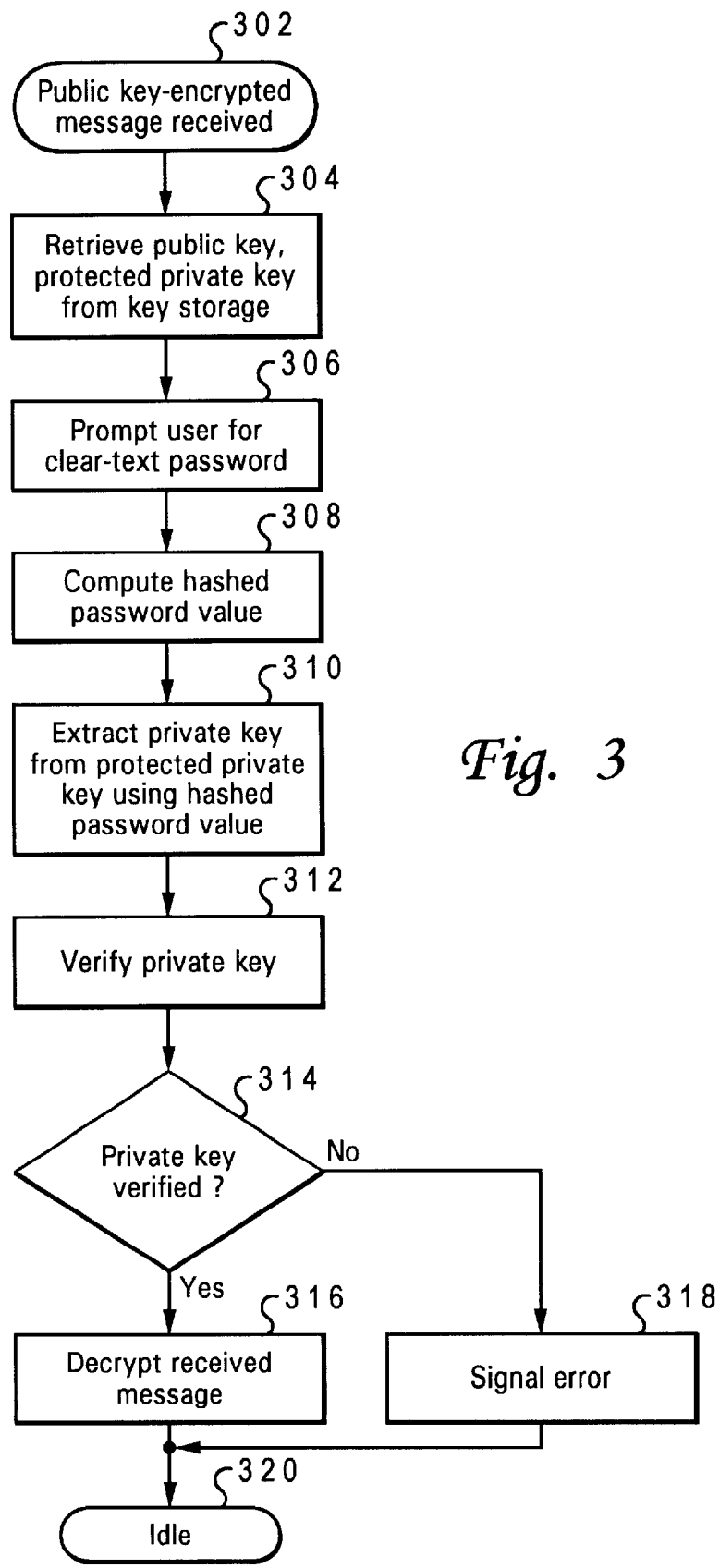
FIG. 3 depicts a high level flowchart for a process of authentication and key recovery in accordance with a preferred embodiment of the present invention.

With reference now to FIG. 3, a high level flowchart for a process of authentication and key recovery in accordance with a preferred embodiment of the present invention is depicted. The process begins at step 302, which depicts receiving a public key-encrypted message from an entity with knowledge of the public encryption key. The process then passes to step 304, which illustrates retrieving the public encryption key and the protected private encryption key from key storage.

The process next passes to step 306, which depicts prompting the user for a clear-text password, and then to step 308, which illustrates computing a hashed password value for the clear-text password received, preferably utilizing a strong, one-way hash function. The process passes next to step 310, which depicts extracting the private key from the protected private key utilizing the hashed password value as a decryption key. The process then passes to step 312, which illustrates verifying the private key by encrypting a well known message with the public key, decrypting the encrypted message with the extracted private key, and comparing the decrypted message with the original well-known message.

The process next passes to step 314, which depicts a determination of whether the private key was verified. If so, the process proceeds to step 316, which illustrates decrypting the originally received message using the extracted and verified private key. If not, however, the process proceeds instead to step 318, which depicts signalling an error. From either of steps 316 or 318, the process proceeds next to step 320, which depicts the process becoming idle until reinitiated for a received message encrypted utilizing the public key.

Figure 4:
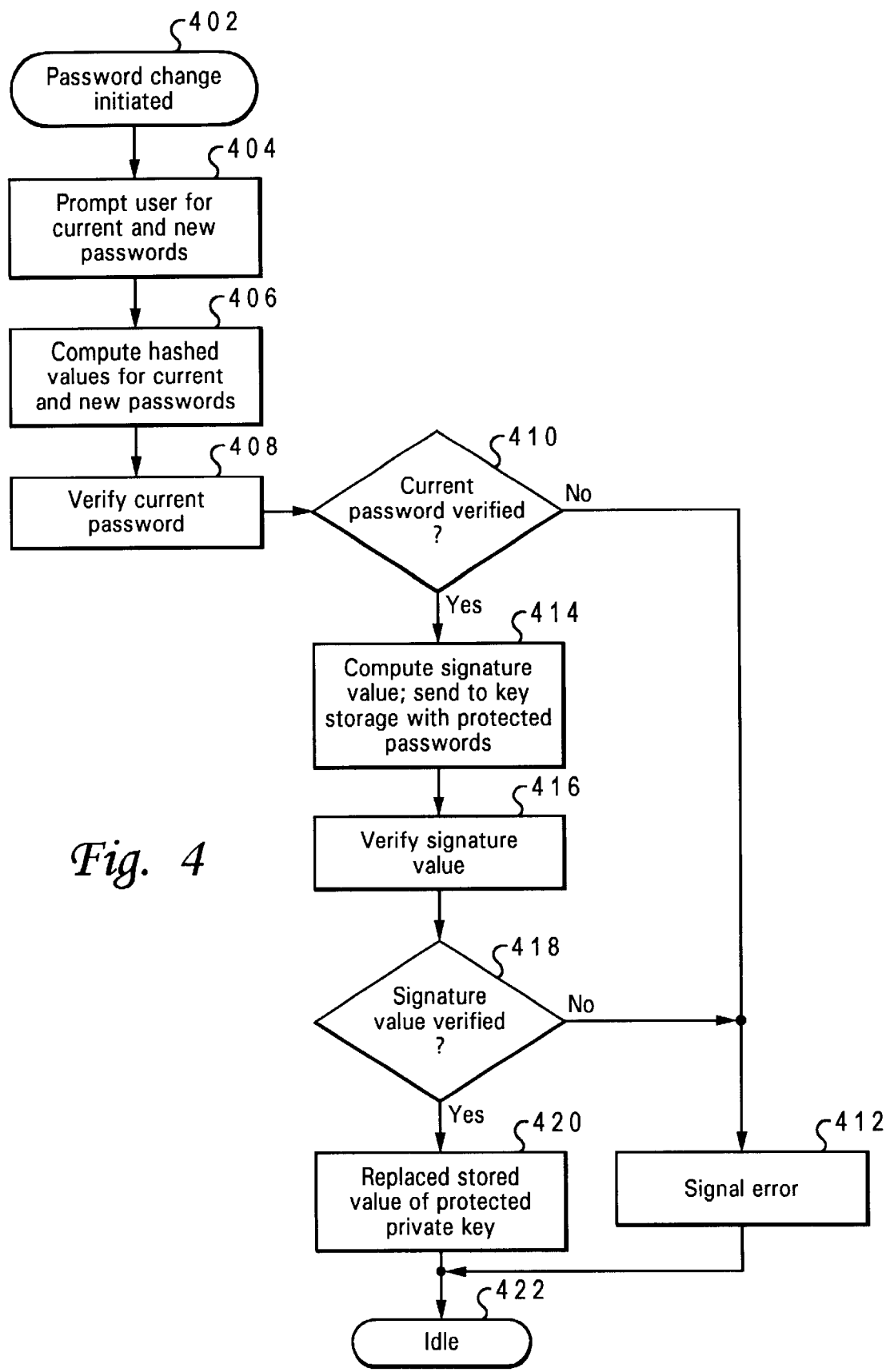
FIG. 4 is a high level flowchart for a process of changing a password employed by the user in secure storage and authentication of private keys in accordance with a preferred embodiment of the present invention.

Referring now to FIG. 4, a high level flowchart for a process of changing a password employed by the user in secure storage and authentication of private keys in accordance with a preferred embodiment of the present invention is illustrated. The process begins at step 402, which depicts the password change process being initiated. The process then passes to step 404, which illustrates prompting the user for current and new passwords, and then to step 406, which depicts computing hashed password values $PW_{curr}$ and $PW_{new}$ for the current and new passwords, respectively, utilizing a strong one-way hash function in accordance with the known art.

The process passes next to step 408, which illustrates verifying the current password $PW_{curr}$ in a manner similar to the process described above in connection with FIG. 3, steps 308–312. That is, a public key and the associated, protected private key are both retrieved from key storage, a well-known message is encrypted utilizing the public key, the private key is extracted from the protected format utilizing a hashed value of the current password, the encrypted well-known message is decrypted utilizing the extracted private key, and the original and decrypted well-known messages are compared. If they match, the current password is considered verified. Otherwise, an error is signaled.

The process next passes to step 410, which illustrates a determination of whether the current password has been verified. If not, the process proceeds to step 412, which depicts signalling an error as described above, and then to step 422, which illustrates the process becoming idle until the process for changing the current password is again initiated. If the current password entered by the user is verified, however, the process proceeds instead to step 414, which illustrates computing a signature value X and sending the signature value X to the key storage along with the current and new password in a protected format.

The motivation for employing a signature value X is two-fold. First, the key storage must protect the password from being changed by an unauthorized user. This may be easily accomplished by requiring the requester of a password change to "sign" a well known message with the private, which should only be available if the correct, current password is known. Second, the value of the well known message which is selected for the requester to "sign" should change with each successful password request in order to guard against replay attacks. A suitable well-known message would be $K_{priv} \odot PW_{curr}$, which will change with every successful password change request as a result of the change to the value of the current password. Thus, the signature value X is preferably computed as:

$$X=K_{priv}(K_{priv} \odot PW).$$

This signature value X is therefore computed and transmitted to the key storage together with the current and new passwords $PW_{curr}$ and $PW_{new}$ in a protected format (e.g., $K_{curr} \odot PW_{new}$).

Referring again to step 414, upon receipt of the values X and $PW_{curr} \odot PW_{new}$, the process passes to step 416, which depicts verify the signature value X. To verify the signature value, the key storage computes $K_{pub}(X)$ and compares it to the stored, protected private key value $K_{priv} \odot PW_{curr}$. This is possible since most PKCS algorithms, although irreversible with a given key, are bidirectional:

$$K_{priv}(K_{pub}(M))=K_{pub}(K_{priv}(M)).$$

If $K_{pub}(X)$ and $K_{priv} \odot PW_{curr}$ agree, then the password change request was signed by an authorized user (someone with knowledge of the password necessary to extract $K_{priv}$ from its protected format) and the password change request is valid. If the signature value cannot be verified, the password process proceeds to step 412, which illustrates signalling an error as described above.

Assuming the password change request is valid, the process then passes to step 418, which depicts replacing the stored value of the protected private key with the new value. The key storage would replace the value $K_{priv} \odot PW_{curr}$ with:

$$(K_{priv} \odot PW_{curr}) \odot PW_{curr} \odot PW_{new})=K_{priv} \odot PW_{new}.$$

Private key $K_{priv}$ is thus updated with a value protected by the hashed value of the new password $PW_{new}$. The process then passes to step 422, which illustrates the process becoming idle until another password change is initiated.

It is noteworthy that, even without requiring a signature value X, a malicious listener could not change the password to any "known" value but could only disable the authorized user by setting the password to an arbitrary "junk" value. To change the password to a known value, knowledge of the current password is required.

Figure 5:
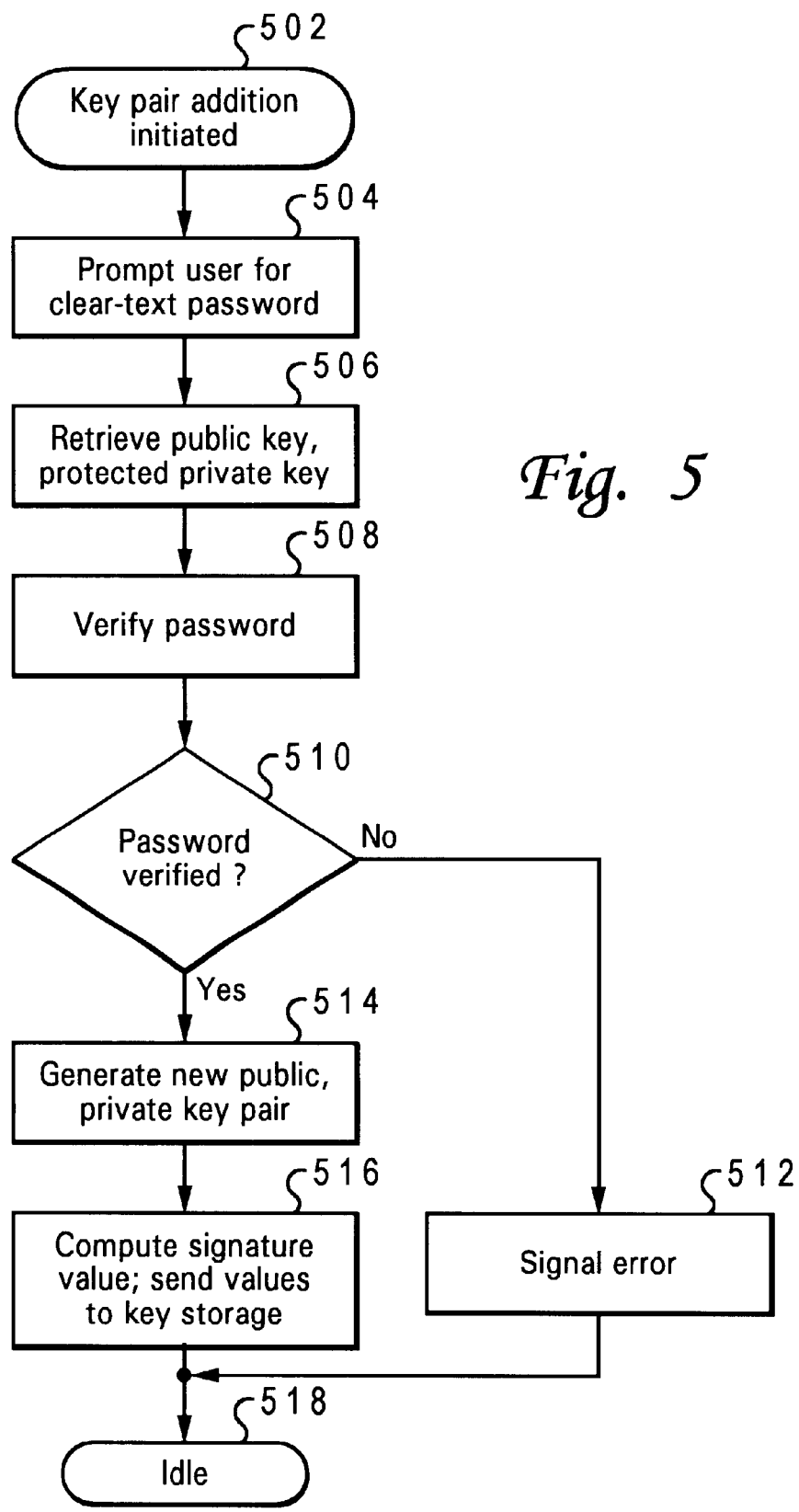
FIG. 5 depicts a high level flowchart for a process of adding public key/private key pairs to the key storage in accordance with a preferred embodiment of the present invention.

With reference now to FIG. 5, a high level flowchart for a process of adding public key/private key pairs to the key storage in accordance with a preferred embodiment of the present invention is depicted. The process begins at step 502, which depicts initiation of key pair addition to the key storage, then passes to step 504, which illustrates prompting the user for the clear-text password. The process next passes to step 506, which illustrates retrieving a public key and associated protected private key from key storage, and the to step 508, which depicts verifying the password as described above.

The process passes next to step 510, which illustrates a determination of whether the password was successfully verified. If not, the process proceeds to step 512, which illustrates signalling an error. If so, however, the process proceeds instead to step 514, which depicts generating a new pair of public and private keys $K_{pub\_new}$ and $K_{priv\_new}$, respectively. The process then passes to step 516, which illustrates computing a signature value X as described above, and transmitting to key storage the signature value X, the new public key $K_{pub\_new}$, and the private key associated public key $K_{pub\_new}$ protected with a hashed value of the password PW to generate a protected private key $K_{priv\_new}$. Protected private key $K_{priv\_new}$ should be further protected for transmission to key storage by computing $K_{priv} \odot K_{priv\_new}$.

Key storage may then verify the signature value X through the technique described earlier. Upon verification of the signature value X, the new public key $K_{pub\_new}$ may be stored in key storage. Key storage may extract the new protected private key from the doubly-protected version of private key transmitted with the signature value X by computing:

$$(K_{priv} \odot PW) \odot (K_{priv} \odot K_{priv\_new}) = K_{priv\_new} \odot PW.$$

The new protected private key $K_{priv\_new}$ may also be added to key storage. The process then proceeds to step 518, which illustrates the process becoming idle until addition of public and protected private keys to key storage is again initiated.

The present invention provides a mechanism for authentication and private key storage and recovery which requires no protection of the private key data, either in the key storage database or on communication lines. This mechanism may therefore be employed to transmit private keys for a PKCS system over unsecured transmission media. The mechanism may also be utilized in conjunction with secured key storage and transmission to further augment security of the PKCS system.

It is important to note that while the present invention has been described in the context of a fully functional data processing system network, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as compact disc read only memories (CD-ROMs), digital versatile discs (DVDs), or erasable, electrically programmable read only memories (EEPROMs), recordable type media such as floppy disks, hard disk drives and ZIP drives, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of authentication and storage of private keys within a public key cryptography system, comprising:

securing a private key in a manner allowing the private key to be extracted from a secured private key utilizing a password;

storing the secured private key in the key storage system in a manner accessible to the client system;

responsive to receiving a message encrypted with a public key corresponding to the private key, the client system retrieving the secured private key from the key storage system via transmission over a communication medium;

the client system extracting the private key from the secured private key utilizing the password; and verifying the extracted private key by the client system performing the steps of:

retrieving the public key from key storage;

encrypting a well-known message with the public key;

decrypting the well-known message utilizing the extracted private key; and comparing the decrypted well-known message to the well-known message.

2. The method of claim 1, wherein the step of securing a private key in a manner allowing the private key to be extracted from a secured private key utilizing a password further comprises:

prompting the user for entry of the password;

responsive to entry of the password, computing a hashed value of the password; and exclusive-ORing the hashed password value with the private key to generate the secured private key.

3. The method of claim 1, wherein the step of storing the secured private key in key storage accessible to a user further comprises:

transmitting the secured private key over the communication medium to the key storage system.

4. The method of claim 1, wherein the step of extracting the private key from the secured private key utilizing the password further comprises:

prompting the user for entry of the password;

responsive to entry of the password, computing a hashed value of the password utilizing a one-way hash function; and exclusive-ORing the hashed password value with the secured private key to extract the private key.

5. The method of claim 4, further comprising:

decrypting the message utilizing the extracted private key.

6. The method of claim 1, further comprising:

prompting a user for entry of a current password and a new password;

responsive to entry of the current and new passwords, computing a hashed value of the current password and a hashed value of the new password utilizing a one-way hash function;

retrieving a secured private key from a key storage system via a communication media, wherein the secured private key can be accessed from the key storage system or communication media by an unauthorized user;

extracting a private key from the secured private key utilizing the hashed current password value;

securing the private key utilizing the hashed new password value;

encrypting the secured private key secured with the hashed new password value utilizing the private key; and transmitting the encrypted, secured private key to the key storage.

7. The method of claim 6, wherein the step of extracting a private key from the secured private key utilizing the hashed current password value further comprises:

exclusive-ORing the secured private key with the hashed current password value.

8. The method of claim 6, wherein the step of securing the private key utilizing the hashed new password value further comprises:

exclusive-ORing the private key with the hashed new password value.

9. The method of claim 6, wherein the step of transmitting the encrypted, secured private key to the key storage further comprises:

transmitting the secured private key secured with the hashed new password value together with the encrypted, secured private key to the key storage.

10. The method of claim 9, further comprising:

verifying the secured private key secured with the hashed new password value and the encrypted, secured private key by:

decrypting the encrypted, secured private key utilizing an associated public key; and comparing the decrypted, secured private key to the secured private key secured with the hashed new password value.

11. A system for authentication and storage of private keys in a public key cryptography system, comprising:

means for securing a private key in a manner allowing the private key to be extracted from a secured private key utilizing a password;

storage means for storing the secured private key in the key storage system in a manner accessible to the client system;

means within the client system responsive to receiving a message encrypted with a public key corresponding to the private key, for retrieving the secured private key from the key storage system via transmission over the communication medium; and means within the client system for extracting the private key from the secured private key utilizing the password; and means within the client for verifying the extracted private key by:

retrieving the public key from key storage;
encrypting a well-known message with the public key;
decrypting the well-known message utilizing the extracted private key; and
comparing the decrypted well-known message to the well-known message.

12. The system of claim 11, wherein the means for securing a private key in a manner allowing the private key to be extracted from a secured private key utilizing a password further comprises:

means for prompting the user for entry of the password;
means, responsive to entry of the password, for computing a hashed value of the password; and
means for exclusive-ORing the hashed password value with the private key to generate the secured private key.

13. The system of claim 11, wherein the storage means further comprises:

means for transmitting the secured private key to key storage.

14. The system of claim 11, wherein the means for extracting the private key from the secured private key utilizing the password further comprises:

means for prompting the user for entry of the password;
means, responsive to entry of the password, for computing a hashed value of the password utilizing a one-way hash function; and
means for exclusive-ORing the hashed password value with the secured private key to extract the private key.

15. The system of claim 14, further comprising:

means for decrypting the message utilizing the extracted private key.

16. The system of claim 15, further comprising:

means for verifying the extracted private key by:
retrieving the public key from key storage;
encrypting a well-known message with the public key;
decrypting the well-known message utilizing the extract private key; and
comparing the decrypted well-known message to the well-known message.

17. The system of claim 15, further comprising:

means for prompting a user for entry of a current password and a new password;
means, responsive to entry of the current and new passwords, for computing a hashed value of the current password and a hashed value of the new password utilizing a one-way hash function;
means for retrieving a secured private key from a key storage system via a communication media, wherein the secured private key can be accessed from the key storage system or communication media by an unauthorized user;
means for extracting a private key from the secured private key utilizing the hashed current password value;
means for securing the private key utilizing the hashed new password value;
means for encrypting the secured private key secured with the hashed new password value utilizing the private key; and
means for transmitting the encrypted, secured private key to the key storage.

18. The system of claim 17, wherein the means for extracting a private key from the secured private key utilizing the hashed current password value further comprises:

means for exclusive-ORing the secured private key with the hashed current password value.

19. The system of claim 17, wherein the means for securing the private key utilizing the hashed new password value further comprises:

means for exclusive-ORing the private key with the hashed new password value.

20. The system of claim 17, wherein the means for transmitting the encrypted, secured private key to the key storage further comprises:

means for transmitting the secured private key secured with the hashed new password value together with the encrypted, secured private key to the key storage.

21. The system of claim 20, further comprising:

means for verifying the secured private key secured with the hashed new password value and the encrypted, secured private key by:
- decrypting the encrypted, secured private key utilizing an associated public key; and
- comparing the decrypted, secured private key to the secured private key secured with the hashed new password value.

22. A computer program product within a computer usable medium of instructions, comprising:
- instructions for securing a private key in a manner allowing the private key to be extracted from a secured private key utilizing a password;
- instructions for storing the secured private key in the key storage system in a manner accessible to the client system;
- instructions within the client system responsive to receiving a message encrypted with a public key corresponding to the private key, for retrieving the secured private key from the key storage system via transmission over the communication medium; and
- instructions within the client system for extracting the private key from the secured private key utilizing the password; and
- instructions within the client for verifying the extracted private key by:
  - retrieving the public key from key storage;
  - encrypting a well-known message with the public key;
  - decrypting the well-known message utilizing the extracted private key; and
  - comparing the decrypted well-known message to the well-known message.

23. A computer program product according to claim 22, further comprising:
- instructions for prompting a user for entry of a current password and a new password;
- instructions, responsive to entry of the current and new passwords, for computing a hashed value of the current password and a hashed value of the new password utilizing a one-way hash function;
- instructions for retrieving a secured private key from a key storage system via a communication media, wherein the secured private key can be accessed from the key storage system or communication media by an unauthorized user;
- instructions for extracting a private key from the secured private key utilizing the hashed current password value;
- instructions for securing the private key utilizing the hashed new password value;
- instructions for encrypting the secured private key secured with the hashed new password value utilizing the private key; and
- instructions for transmitting the encrypted, secured private key to the key storage.

* * * * *